United States Patent
Zhu et al.

(10) Patent No.: US 9,679,597 B1
(45) Date of Patent: Jun. 13, 2017

(54) BIDIRECTIONAL SHINGLED MAGNETIC RECORDING IN A HEAT-ASSISTED MAGNETIC RECORDING DEVICE

(71) Applicant: Seagate Technology LLC, Cupertino, CA (US)

(72) Inventors: Wenzhong Zhu, Apple Valley, MN (US); Alfredo Sam Chu, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/205,190

(22) Filed: Jul. 8, 2016

(51) Int. Cl.
- *G11B 5/02* (2006.01)
- *G11B 5/09* (2006.01)
- *G11B 5/596* (2006.01)
- *G11B 5/55* (2006.01)
- *G11B 5/00* (2006.01)

(52) U.S. Cl.
CPC ............ *G11B 5/596* (2013.01); *G11B 5/5526* (2013.01); *G11B 2005/0021* (2013.01)

(58) Field of Classification Search
CPC ... G11B 2220/90; G11B 15/087; G11B 5/919; G11B 27/36; G11B 5/012; G11B 20/1426; G11B 5/09; G11B 27/3027; G11B 5/00
USPC ....................... 360/18, 22, 24, 31, 40, 48, 55
See application file for complete search history.

(56) References Cited

U.S. PATENT DOCUMENTS

| | | | |
|---|---|---|---|
| 8,179,627 B2 | 5/2012 | Chang et al. | |
| 8,482,874 B2 | 7/2013 | Tinker | |
| 8,867,161 B2 | 10/2014 | Emo et al. | |
| 8,873,178 B2 * | 10/2014 | Erden | G11B 20/1217 360/39 |
| 8,913,335 B2 | 12/2014 | Coker et al. | |
| 9,111,578 B1 | 8/2015 | Hassel et al. | |
| 2015/0254144 A1 | 9/2015 | Pantel | |

OTHER PUBLICATIONS

Cordle et al., "Radius and Skew Effects in an HAMR Hard Disk Drive", IEEE Transactions on Magnetics, vol. 52, No. 2, Feb. 2016, 7 pages.

* cited by examiner

*Primary Examiner* — Nabil Hindi
(74) *Attorney, Agent, or Firm* — Hollingsworth Davis, LLC

(57) ABSTRACT

An apparatus and method involves a writer configured for heat-assisted magnetic recording of data to a magnetic storage medium. A controller is coupled to the writer. The controller and writer are configured to write data to a plurality of concentric bands of the medium each comprising a plurality of partially overlapping narrow data tracks and a wide track. The wide tracks of successive bands are positioned adjacent to one another with no intervening narrow data track therebetween.

20 Claims, 10 Drawing Sheets

US 9,679,597 B1

BIDIRECTIONAL SHINGLED MAGNETIC RECORDING IN A HEAT-ASSISTED MAGNETIC RECORDING DEVICE

SUMMARY

Embodiments are directed to an apparatus comprising a writer configured for heat-assisted magnetic recording of data to a magnetic storage medium. A controller is coupled to the writer. The controller and writer are configured to write data to a plurality of concentric bands of the medium each comprising a plurality of partially overlapping narrow data tracks and a wide track. The wide tracks of successive bands are positioned adjacent to one another with no intervening narrow data track therebetween.

Embodiments are directed to an apparatus comprising a writer configured for heat-assisted magnetic recording of data to a magnetic storage medium comprising a plurality of concentric bands each comprising a plurality of data tracks. A controller is coupled to the writer and configured to move the writer in a first direction to successively write data to a plurality of partially overlapping narrow data tracks and then to a wide track of a first band. The controller is configured to move the writer further in the first direction to a second band adjacent the first band. The controller is further configured to move the writer in a second direction opposite the first direction to successively write data to partially overlapping narrow data tracks and then to a wide track of the second band. The wide tracks of the first and second bands are positioned adjacent to one another with no intervening narrow data track therebetween.

Embodiments are directed to a method comprising moving a writer configured for heat-assisted magnetic recording in a first direction relative to a magnetic storage medium to successively write data to a plurality of partially overlapping narrow data tracks and then to a wide track of a first band of the medium. The method also comprises moving the writer further in the first direction to a second band adjacent the first band. The method further comprises moving the writer in a second direction opposite the first direction to successively write data to partially overlapping narrow data tracks and then to a wide track of the second band. The wide tracks of the first and second bands are positioned adjacent to one another with no intervening narrow data track therebetween.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). More particularly, the present disclosure relates to HAMR devices configured to implement shingled magnetic recording (SMR). In general, HAMR devices use a laser source and a near-field transducer (NFT) to heat a small spot on a magnetic recording medium during recording. The heat lowers magnetic coercivity at the spot, allowing a write transducer to change the orientation of a magnetic domain at the spot. Due to the relatively high coercivity of the medium after cooling, the data is less susceptible to superparamagnetic effects that can lead to data errors.

Figure 1:
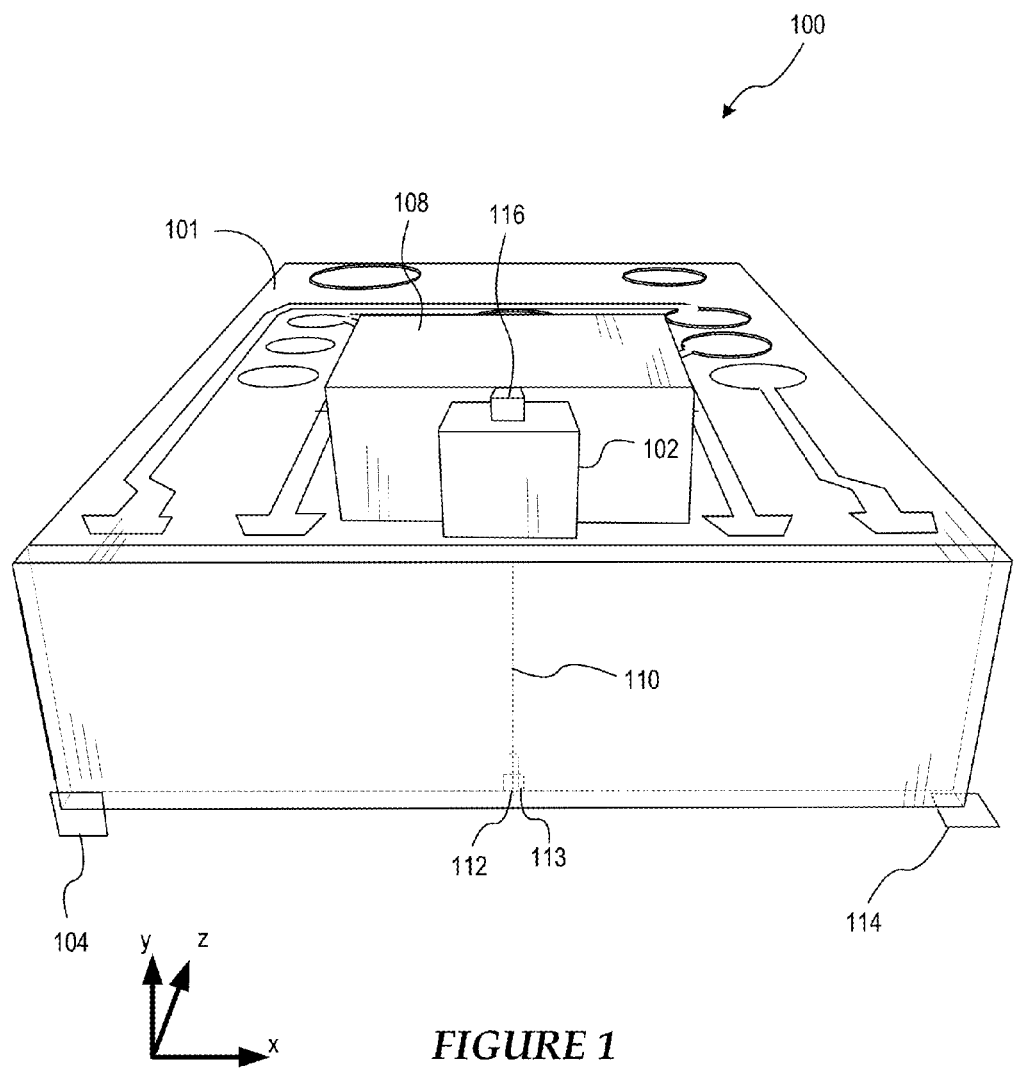
FIG. 1 is a perspective view of a heat-assisted magnetic recording (HAMR) slider with which various embodiments disclosed herein may be implemented.
Figure 2:
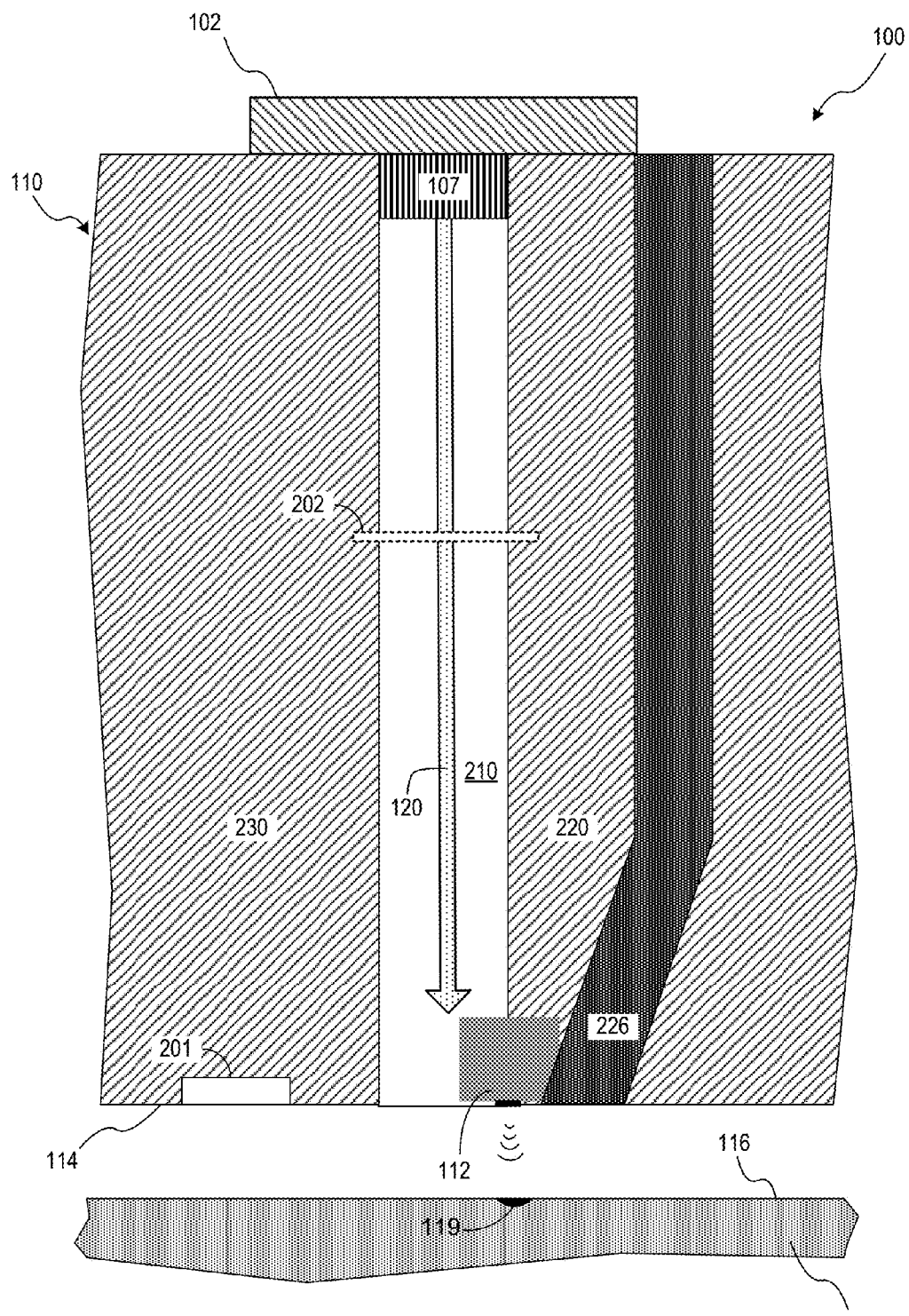
FIG. 2 is a cross-sectional view of a HAMR slider with which various embodiments disclosed herein may be implemented.

Embodiments of a HAMR head 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. The ABS 114 faces, and is held proximate to, a surface 116 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, an optical coupler, or other coupling features to receive light from the laser diode 102.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In the HAMR head 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter 107 and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAMR head 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more contact sensors, such as the contact sensor 201 shown in FIG. 2. The contact sensor 201 can be configured to sense for one or more of head-medium contact, thermal asperities, and voids of a magnetic recording medium. The contact sensor 201 can be situated at or near the ABS 114 and proximate the NFT 112. As such, the contact sensor 201 can serve as a temperature sensor for the NFT 112 and as a head-medium/asperity contact sensor. In addition, the contact sensor 201 can serve as a laser power monitor responsive to high-frequency laser light modulation in accordance with various embodiments disclosed herein. According to some embodiments, the head 100 shown in FIG. 2 can incorporate a bolometer 202 situated in the vicinity of the light path (e.g., the waveguide 110) and proximal of the NFT 112 in accordance with various embodiments. In some embodiments, the bolometer 202 comprises a thin metallic wire placed across the light path (e.g., the waveguide 110) within the internal body of the slider 100 at a location between the coupler 107 and the NFT 112. Fluctuations in output optical power of the laser 102 correlate to fluctuations in thermal power and temperature of the bolometer 202. These fluctuations in temperature can be detected by circuitry configured to monitor the resistance fluctuations in the wire by using a small bias current and a high thermal coefficient of resistance material.

Embodiments are directed to a HAMR device (e.g., a hard disk drive or HDD) configured to implement shingled magnetic recording. Generally, SMR devices, such as SMR HDDs, utilize adapted recording techniques for increasing data storage density. In order to describe general aspects of SMR operation, reference is made to the block diagram of FIG. 3 which illustrates an SMR hard drive 300 according to an illustrative embodiment. The hard drive 300 is communicatively coupled to a controller 320, such as an HDD controller. The controller 320 is configured to coordinate SMR according to various embodiments disclosed herein. The hard drive 300 includes a one or more magnetic disks 304 that store data through the application of localized magnetic fields applied to the disks 304. The magnetic fields are applied by a recording head which may be included in a slider 306 disposed on a pivoting arm 308. The slider 306 also includes a read head that senses the stored magnetic fields in the disk 304. As the disk 304 rotates, the arm 308 positions the slider 306 to read and write particular tracks of the media 304

In a conventional hard drive arrangement, the data is written in tracks that generally correspond to concentric circular rings on the disk. The tracks are further divided into sectors, which may represent the basic unit of storage on the drive. The sector may be shaped, for example, as a circular arc segment. An industry standard hard drive sector includes 512 bytes of user data, although other sector sizes can be defined under some conditions. A 512 byte physical sector can (and usually does) store more than 512 bytes of data, as the sector may store additional overhead data (e.g., error correction codes, identifier information) along with the user data.

The sector generally represents the smallest randomly accessible unit of storage on a conventional hard drive, and individual sectors may be read from, written to, and updated without necessarily affecting neighboring sectors. Because individual sectors can be independently read from and written to, a conventional hard drive exhibits relatively symmetrical performance between random read and write operations. However, in order to further increase data storage densities, future storage devices may utilize designs that change this symmetry between read and write performance. Various schemes have been developed to increase storage densities using existing recording media by modifying the reading, writing, and signal processing of data stored on the media. One of these schemes is known as "shingled writing"

or shingled magnetic recording. This type of recording may also be referred to as high track density recording (HTDR) and/or banded recording.

An SMR drive uses a different arrangement of tracks than what is used in conventional hard drives. The tracks (and the sectors therein) of conventional hard drives can be independently read from and written to. However, as the tracks widths are decreased in order to accommodate higher densities, the recorded signal must diminish on both sides of a newly written track in order to leave a gap between tracks, and this becomes more difficult as tracks get narrower and closer together. For example, because of physical limitations in the write head, it may be difficult to generate a field that is both strong enough to write to the media and yet confined in a small enough space so as not to affect adjacent tracks.

Figure 3:
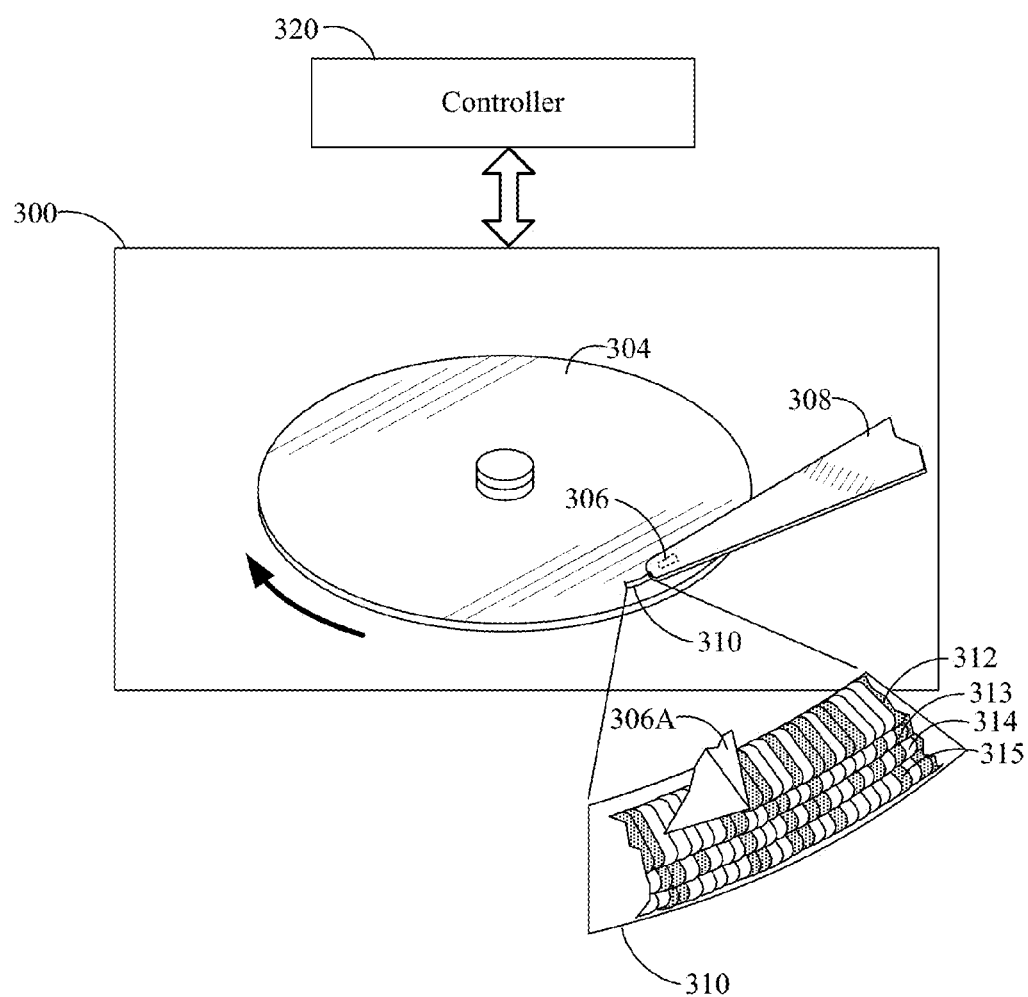
FIG. 3 illustrates a shingled magnetic recording (SMR) hard drive according to illustrative embodiments.

One solution to this problem, as illustrated in FIG. 3, is to layer, or "shingle," a set of tracks one over the other. The overlaying of tracks is shown in close-up view of area 310 of media 304. In area 310, a corner of write head 306A is shown writing a track portion 312. Different shading within the track portion 312 represents different magnetic orientations that correspond to different values of stored binary data. The track portion 312 is overlaid over part of track portion 313. Similarly, track portion 313 is overlaid over part of portion 314, portion 314 is overlaid over portion 315, etc.

The partially overlapping tracks 312-315 may be part of what is referred to as a band of tracks. Each band includes a number of partially overlapping tracks (referred to herein as narrow tracks) and terminates with a single wide track (e.g., track 312). The narrow tracks are narrower than the width of the write pole of the recording head (e.g., about the width of the read head), and the wide track is about the same width as the write pole. Each band can contain between about 10 and 100 tracks, for example, and a single surface of a magnetic recording medium can contain between about 2,500 and 25,000 bands.

By using overlapping narrow tracks 312-315, the write head 306A can be adapted to generate high local fields without consideration of adjacent track erasure. As a result of these high fields, the data patterns may have more uniform vertical magnetic fields and can penetrate deeper into the medium. This allows a shingled-writing scheme to substantially increase data density compared to convention track writing schemes. Reading of the tracks 312-315 may be performed analogously to a conventional hard drive, with portions of each band being randomly accessed and read. However, the data may not be randomly written to or updated in a manner similar to a conventional hard drive.

As may be apparent from FIG. 3, this overlaying of successive tracks within a band means that individual regions of a band may not be randomly updated on their own. Because the tracks are written in sequential concentric bands, tracks 312-315 cannot be updated without recovering/rewriting portions of subsequently written data. This gives rise to an asymmetry between random write and read performance of an SMR device. To address the challenge of overcoming the random rewriting process, SMR drives use cache consists of a section of the disk and/or NAND flash as a temporary storage before the data is written to the final destination. The drive uses the cache location to hold data as it reorganizes it. Once the data is reorganized, the drive rewrites it sequentially back to the home destination. An SMR HDD may also utilize DRAM caching to aggregate incoming random write data before writing the data to the disk. Using these or similar techniques, the asymmetry may be negligible or non-existent when writing random and sequential data.

Figure 4:
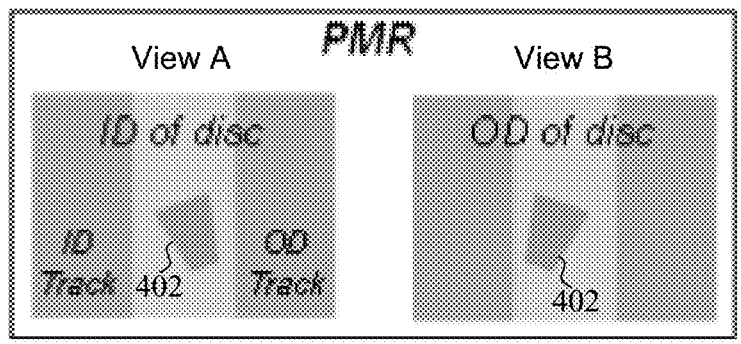
FIGS. 4 and 5 show writer geometry for perpendicular magnetic recording (PMR) (FIG. 4) and HAMR (FIG. 5)
Figure 5:
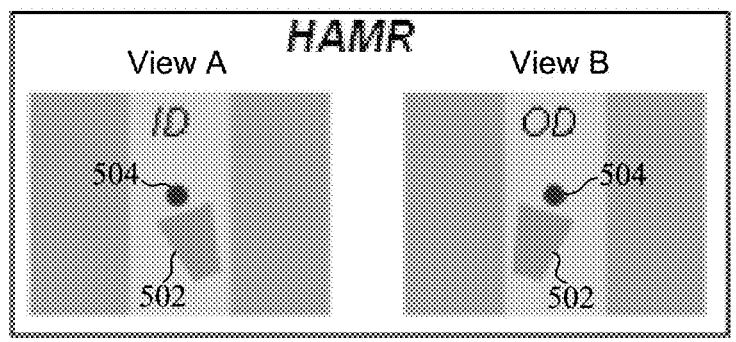

Reference is made to FIGS. 4 and 5, which show the writer geometry for perpendicular magnetic recording (PMR) (FIG. 4) and HAMR (FIG. 5). In PMR, the magnetic transition is mainly governed by the write pole 402. In HAMR, the transition is more sensitive to the NFT than the write pole 502. It is noted that the spot 504 shown in FIG. 5 is the projected thermal profile from the NFT of the HAMR writer. Adjacent track interference (ATI), for example, can be understood in PMR and HAMR by imagining the projected magnetic profile of the write pole 402 (in the case of PMR) and the projected thermal profile 504 from the NFT (in the case of HAMR). If either of these profiles comes within some critical distance to the neighboring tracks, the performance of these tracks will suffer. In PMR, the write pole is trapezoidal or square in shape, and therefore, its projected profile onto the media tends to favor the outer diameter (OD) track when the recording head is positioned at the inner diameter (ID) of the disk (see View A of FIG. 4). The projected profile of the PMR write pole onto the media tends to favor the ID track when the recording head is positioned at the OD of the disk (see View B of FIG. 4). On the other hand, in HAMR, because the recording process is more responsive to the NFT than the write pole and because the NFT's thermal profile is more circular, there is no proclivity to either adjacent track regardless of the recording head's position (stroke) on the disk (see Views A and B of FIG. 5).

Figure 6A:
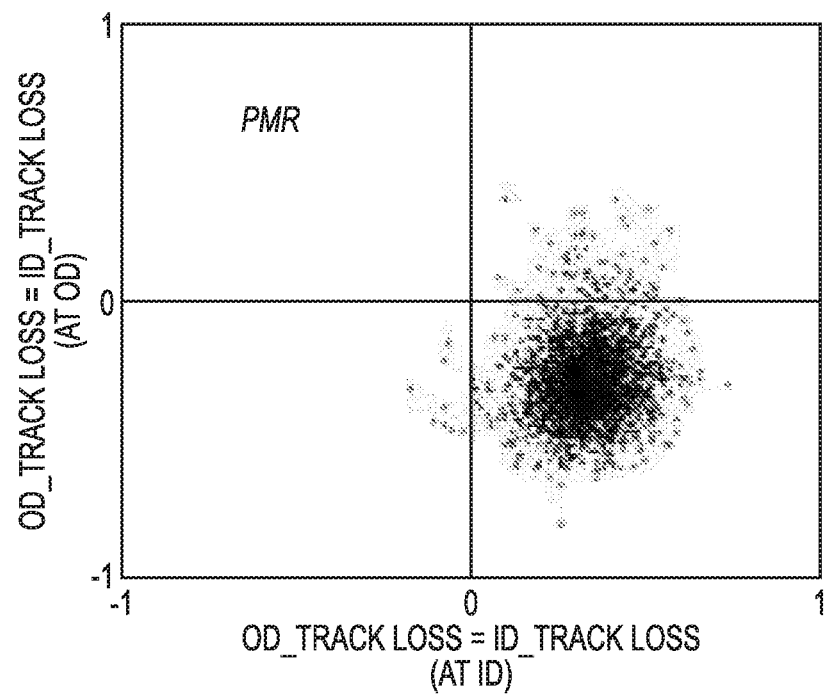
FIGS. 6A and 6B show adjacent track interference (ATI) characteristics at extreme radii of a disk for PMR (FIG. 6A) and HAMR (FIG. 6B)
Figure 6B:
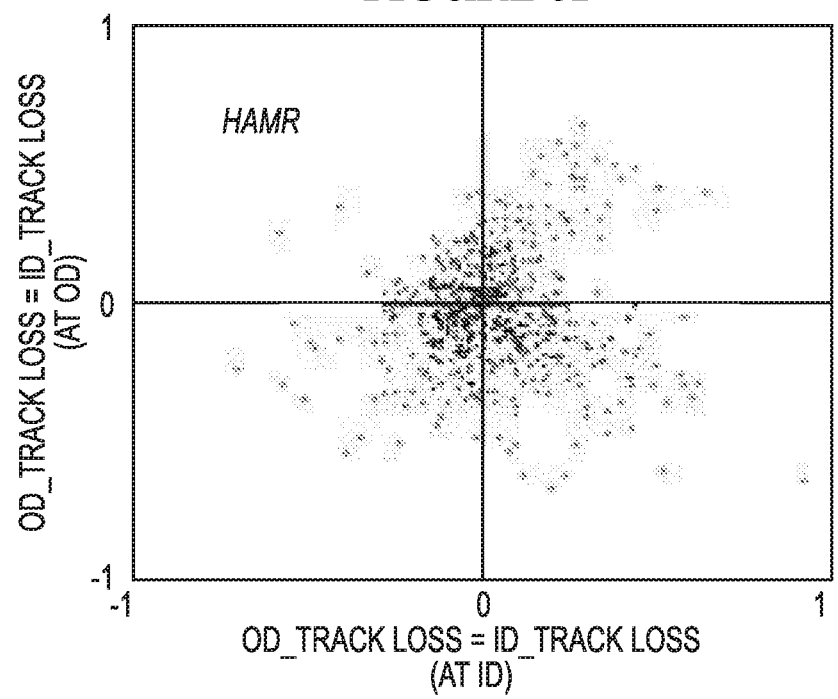

FIGS. 6A and 6B show adjacent track interference (ATI) characteristics at extreme radii of a disk for PMR (FIG. 6A) and HAMR (FIG. 6B). In FIGS. 6A and 6B, the y-axis represents the difference in performance (arbitrary units) between the OD track and the ID track when the recording head is at the OD of the disk and the center track was repeatability written. The x-axis represents the difference in performance between the OD Track and the ID track when the recording head is at the ID of the disk when the center track was repeatability written. Each point in FIGS. 6A and 6B represents one recording head. In PMR, the loss in performance of the OD track is greater than the loss of performance of the ID track when the recording head is at the ID and vice versa when the recording head is at the OD of the disk. In contrast, the HAMR heads do not show that same trend, and in fact, lack a bias toward either direction. This is in agreement with the geometrical discussion provided above with reference to FIGS. 4 and 5.

As was discussed previously, shingled magnetic recording has two different track pitches inside the band: small track pitch/high TPI (tracks per inch) for partially overlapped tracks and large track pitch/low TPI for non-overlapped tracks (e.g., a wide track). In conventional SMR, each band has one wide track, and the wide track reduces drive capacity. Moreover, a guard band separates each band in conventional SMR, resulting in an additional reduction in drive capacity. Embodiments of the disclosure are directed to SMR techniques that alternate the shingling direction so that the wide tracks of two successive bands are located adjacently. Depending on a number of factors, such as the width of wide track, partially overlapped tracks, and guard band, it is possible to partially or completely eliminate a guard band between the adjacently positioned wide tracks. In some embodiments, the two adjacently positioned wide tracks can partially overlap each other in order to further increase drive capacity.

Figure 7:
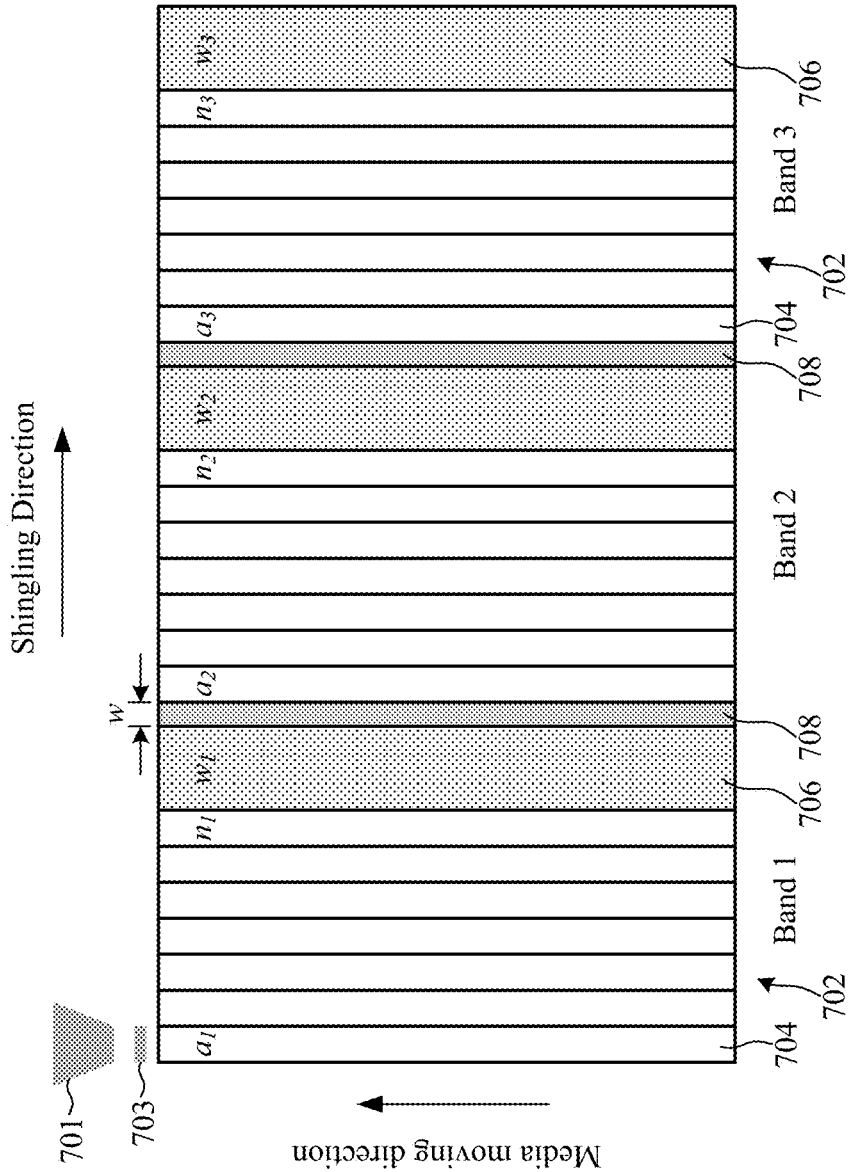
FIG. 7 illustrates shingled magnetic recording in accordance with a conventional approach.

FIG. 7 illustrates shingled magnetic recording in accordance with a conventional approach. In FIG. 7, a portion of a magnetic recording medium is shown which includes three adjacently located concentric bands 702, shown as Band 1, Band 2, and Band 3. Each of the bands 702 includes a number of tracks including a number of partially overlapping narrow tracks 704 (tracks a-n) and a wide track 706 at the terminal end of each band 702. Separating each band 702 is a guard band 708 having a width, w. The direction of media rotation relative to a writer 701 and a reader 703 of a conventional PMR HDD is indicated at the left side of FIG. 7. The direction of shingling recording, which is the direction of the writer 701 across the stroke of the disk, is indicated at the top side of FIG. 7.

According to the conventional SMR approach for PMR shown in FIG. 7, the writer 701 is positioned at track $a_1$ of Band 1 and, with the writer 701 moving in the indicated shingling direction (left to right), a number of partially overlapping narrow tracks ($a_1$-$n_1$) are written for Band 1. After writing the last narrow track $n_1$ of Band 1, a wide track $w_1$ is written, thus completing writing to Band 1. A guard band 708 is provided between the wide track $w_1$ of Band 1 and the first narrow track $a_2$ of Band 2. With the writer 701 positioned at track $a_2$ of Band 2 and the writer 701 moving in the indicated shingling direction, a number of partially overlapping narrow tracks ($a_2$-$n_2$) are written for Band 2. After recording the last narrow track $n_2$ of Band 2, a wide track $w_2$ is written, thus completing writing to Band 2. A guard band 708 is provided between the wide track $w_2$ of Band 2 and the first narrow track $a_3$ of Band 3. With the writer 701 positioned at track $a_3$ of Band 3 and the writer 701 moving in the indicated shingling direction, a number of partially overlapping narrow tracks ($a_3$-$n_3$) are written for Band 3. After recording the last narrow track $n_3$ of Band 3, a wide track $w_3$ is written, thus completing writing to Band 3. This process is repeated with the writer 701 moving in the indicated shingling direction for subsequent bands 702 of the disk.

FIG. 7 shows a conventional SMR layout for PMR. Since the erasure field is smaller at the ID side than the OD side when the recording head is positioned at the ID of the disk and vice versa when the recording head is at the OD of the disk, the preferred shingling direction is from ID to OD at the ID of the disk and from OD to ID at the OD of the disk. As a consequence, the shingling direction cannot be alternated between bands.

Figure 8:
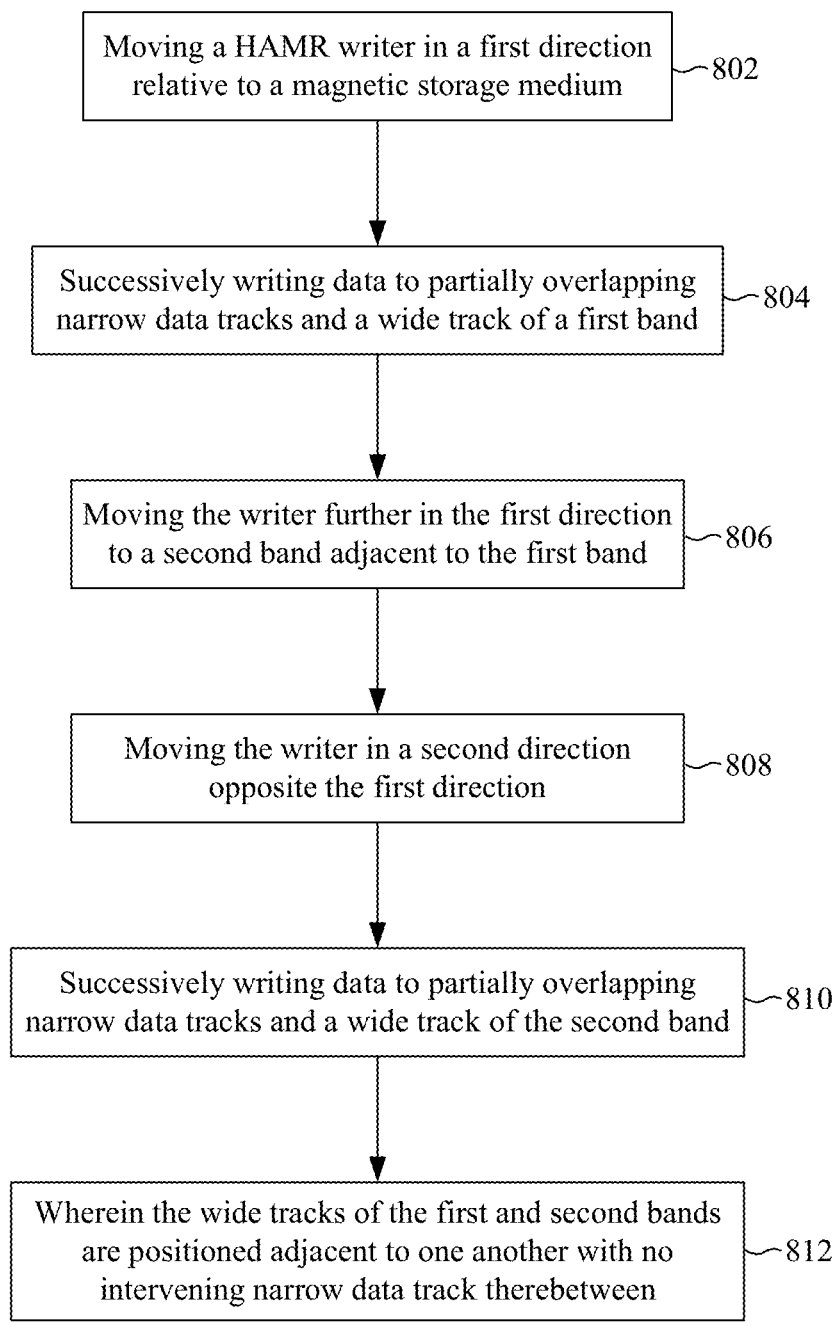
FIG. 8 is a flow chart showing a method of shingled magnetic recording using a HAMR writer in accordance with various embodiments.

FIG. 8 is a flow chart showing a method of shingled magnetic recording using a HAMR writer in accordance with various embodiments. The method of FIG. 8 involves moving 802 a HAMR writer in a first direction relative to the magnetic storage medium, and successively 804 writing data to partially overlapping narrow data tracks and a wide track of a first band. The method involves moving 806 the writer further in the first direction to a second band adjacent to the first band.

With the writer positioned at the beginning of the second band, the shingling direction is reversed, and the writer is moved 808 in a second direction opposite the first direction. With the writer moving in the second direction, the method involves successively writing 810 data to partially overlapping narrow data tracks and a wide track of the second band. Having written data to the first and second bands, the wide tracks of the first and second bands are positioned 812 adjacent to one another with no intervening narrow data track therebetween.

Figure 9:
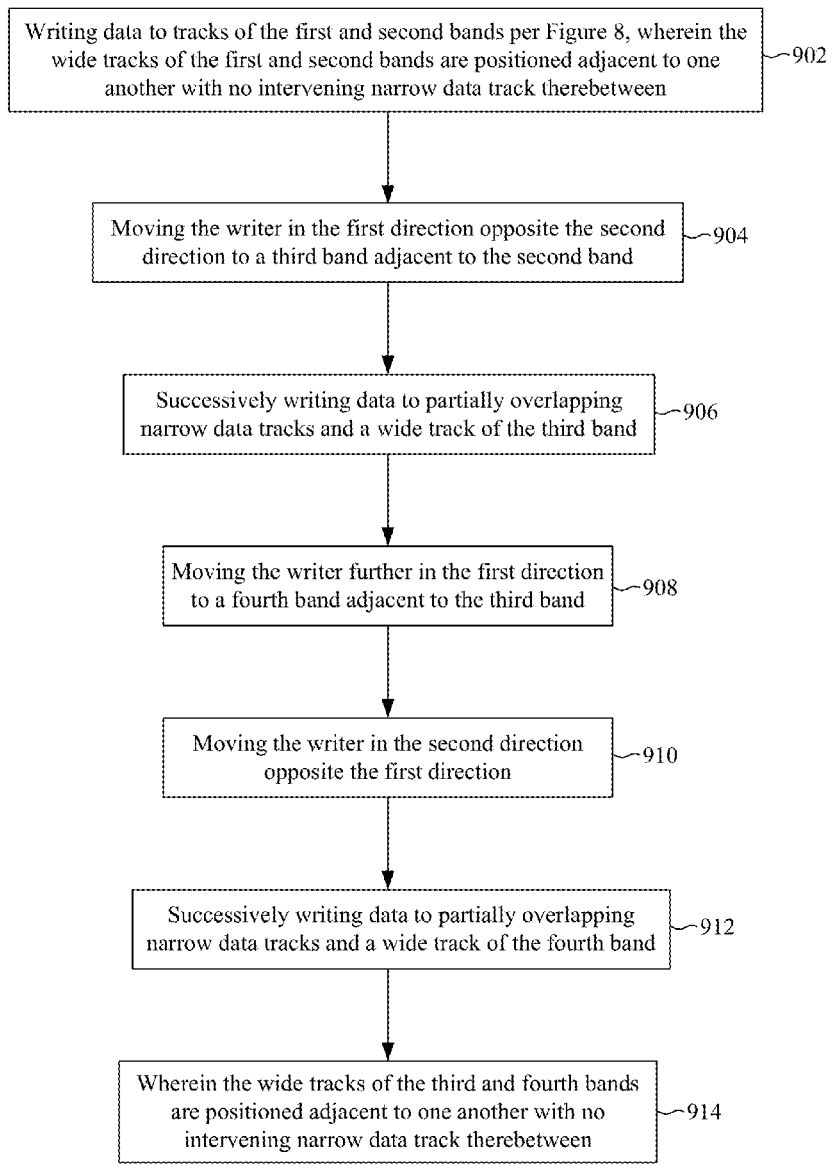
FIG. 9 is a flow chart showing additional processes of the shingled magnetic recording approach illustrated in FIG. 8.

FIG. 9 is a flow chart showing additional processes of the shingled magnetic recording approach illustrated in FIG. 8. The method of FIG. 9 involves writing 902 data to tracks of the first and second bands as set forth in FIG. 8, wherein the wide tracks of the first and second bands are positioned adjacent to one another with no intervening narrow data track therebetween. The method of FIG. 9 further involves moving 904 the writer in the first direction opposite the second direction to a third band adjacent to the second band. It is noted that a guard band is preferably provided between the first narrow track of the second band and the first narrow track of the third band.

With the writer moving in the first direction, the method involves successively writing 906 data to partially overlapping narrow data tracks and a wide track of the third band. The writer is then moved 908 further in the first direction to a fourth band adjacent to the third band. With the writer positioned at the beginning of the fourth band, the shingling direction is reversed, and the writer is moved 910 in the second direction opposite the first direction. With the writer moving in the second direction, the method involves successively writing 912 data to partially overlapping narrow data tracks and a wide track of the fourth band. Having written data to the third and fourth bands, the wide tracks of the third and fourth bands are positioned 914 adjacent to one another with no intervening narrow data tracks therebetween.

Figure 10:
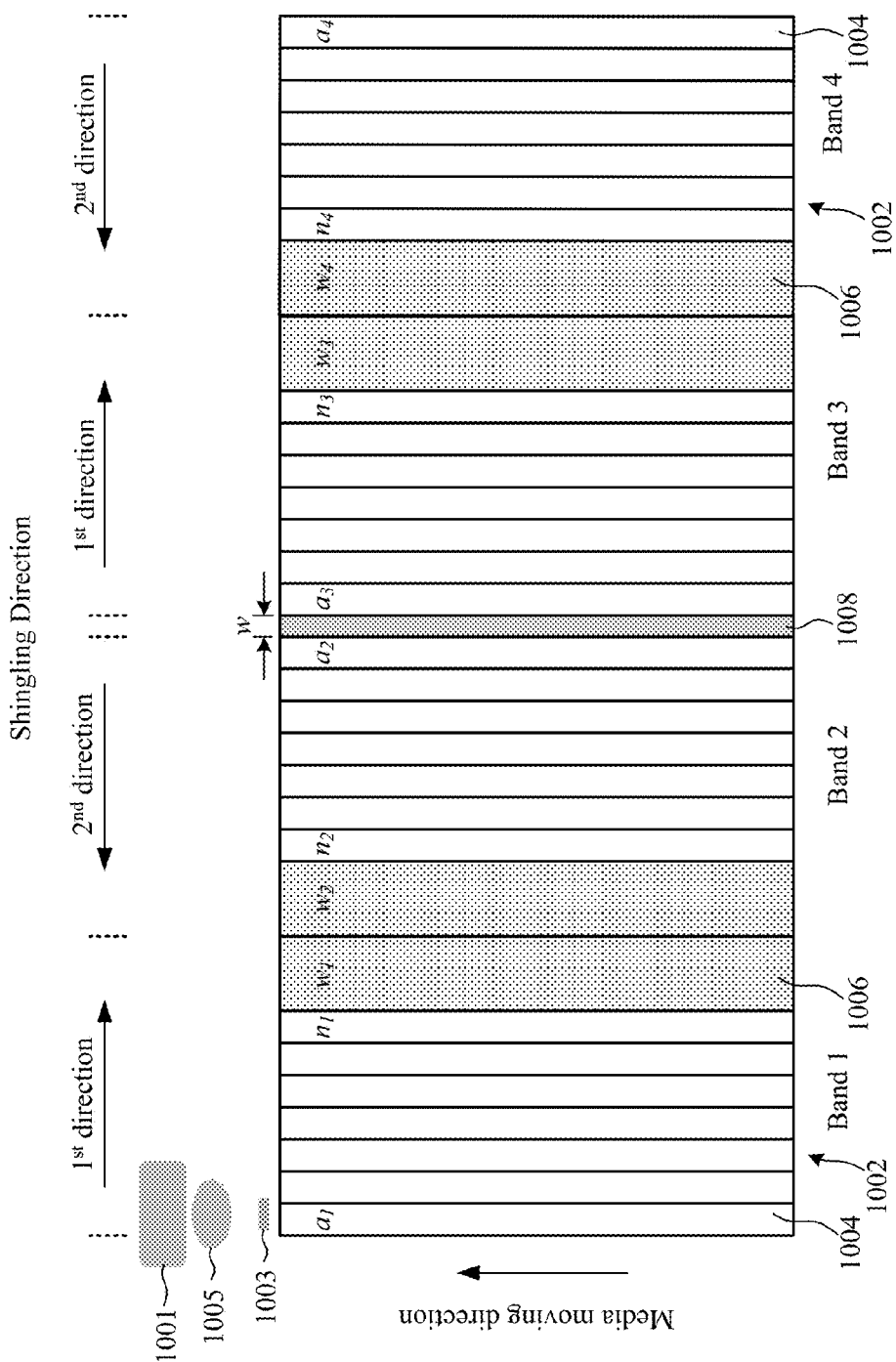
FIG. 10 illustrates shingled magnetic recording in accordance with various embodiments of the disclosure.

FIG. 10 illustrates shingled magnetic recording in accordance with various embodiments of the disclosure. In FIG. 10, a portion of a magnetic recording medium is shown which includes four adjacently located concentric bands 1002, shown as Band 1, Band 2, Band 3, and Band 4. Each of the bands 1002 includes a number of tracks including a number of partially overlapping narrow tracks 1004 (tracks a-n) and a wide track 1006 at the terminal end of each band 1002. Separating each pair of bands 1002 (e.g., two adjacent bands 1002 with adjacently positioned wide tracks) is a guard band 1008 having a width, w. In the embodiment shown in FIG. 10, a single guard band 1008 is utilized for every four bands 1002, while a single guard band 708 is utilized for every two bands 702 in the conventional SMR layout shown in FIG. 7. As such, a 50% reduction in the number of guard bands 10010 can be realized using an SMR layout of the present disclosure. The direction of media rotation relative to a writer 1001, projected thermal profile 1005 (from the NFT) and a reader 1003 of a HAMR HDD is indicated at the left side of FIG. 10. The direction of shingling recording (left and right across the page or cross-track), which is controlled by an HDD controller, is indicated at the top side of FIG. 10.

According to the SMR approach for HAMR shown in FIG. 10, the writer 1001 (e.g., write pole and NFT) is positioned at track $a_1$ of Band 1 and, with the writer 1001 moving in the indicated shingling direction (left to right or first direction), a number of partially overlapping narrow tracks ($a_1$-$n_1$) are written for Band 1. After writing the last narrow track $n_1$ of Band 1, a wide track $w_1$ is written, thus completing writing to Band 1. The writer 1001 is advanced further in the first direction until the first narrow track $a_2$ of Band 2 is reached. The shingling direction is reversed at the first narrow track $a_2$ of Band 2. With the writer 1001 positioned at track $a_2$ of Band 2 and the writer 1001 moving in the second direction (right to left) opposite the first direction, a number of partially overlapping narrow tracks ($a_2$-$n_2$) are written for Band 2. After recording the last narrow track $n_2$ of Band 2, a wide track $w_2$ is written, thus completing writing to Band 2.

As can be seen in FIG. 10, the two wide tracks $w_1$ and $w_2$ of the first and second bands 1002 are positioned immediately adjacent to one another with no intervening narrow track or guard band therebetween. In some embodiments, a guard band can be provided between the two wide tracks $w_1$ and $w_2$ of the first and second bands 1002.

Having written to the wide track $w_2$, the shingling direction is reversed and the writer 1001 is advanced in the first direction to the first narrow track $a_3$ of Band 3. A guard band 1008 is provided between the first narrow track $a_2$ of Band 2 and the first narrow track $a_3$ of Band 3. With the writer 1001 positioned at track $a_3$ of Band 3 and the writer 1001 moving in first direction, a number of partially overlapping narrow tracks ($a_3$-$n_3$) are written for Band 3. After recording the last narrow track $n_3$ of Band 3, a wide track $w_3$ is written, thus completing writing to Band 3.

The writer 1001 is advanced further in the first direction until the first narrow track $a_4$ of Band 4 is reached. The shingling direction is reversed at the first narrow track $a_4$ of Band 4. With the writer 1001 positioned at track $a_4$ of Band 4 and the writer 1001 moving in the second direction, a number of partially overlapping narrow tracks ($a_4$-$n_4$) are written for Band 4. After recording the last narrow track $n_4$ of Band 4, a wide track $w_4$ is written, thus completing writing to Band 4. This process is repeated with the writer 1001 moving in the indicated (alternating) shingling direction for subsequent bands 1002 of the disk.

FIG. 10 illustrates a representative SMR layout in HAMR. Since the thermal profile 1005 is generally circular and the erasure is symmetrical between the OD side and ID side, there is no preferred shingling direction. As such, the shingling direction can be alternated between bands such that two bands' wide tracks are side-by-side. In some embodiments, such as that shown in FIG. 10, a guard band between adjacent wide tracks of two bands can be partially or completely eliminated. In other embodiments, depending on the widths of the guard band and wide tracks, it is possible to partially overlap the two adjacently positioned wide tracks to increase drive capacity further.

The following provides a quantitative comparison in terms of drive capacity between a conventional SMR layout in PMR and an SMR layout in HAMR in accordance with various embodiments. The following comparison does not consider different BPI (bits per inch) or written track widths for the wide track. In the case of a conventional SMR layout in PMR, the recording area for two bands with N tracks per band is equal to:

$$2 * \text{guard band widths} + 2 * (N-1) \text{ partial overlap track widths} + 2 \text{ wide track widths.}$$

In the case of an SMR layout in HAMR in accordance with various embodiments, the recording area for two bands with N tracks per band is equal to:

$$1 * \text{guard band widths} + 2 * (N-1) \text{ partial overlap track widths} + 2 \text{ wide track widths} + (1 \text{ guard band width} - 2 * (\text{wide track width} - \text{partial overlap tracks width})).$$

The area saved by using an SMR layout in HAMR in accordance with various embodiments in comparison to a conventional SMR layout in PMR is equal to:

$$\text{wide track width} - \text{partial overlap track width per band.}$$

Depending on the widths of the wide tracks, the partial overlap track width, and guard band, the guard band between two adjacently positioned wide tracks can be partially eliminated if:

$$(\text{wide track width} - \text{partial overlap track width}) < \tfrac{1}{2} \text{ guard band width.}$$

The guard band between two adjacently positioned wide tracks can be completely eliminated if:

$$\text{wide track width} - \text{partial overlap track width}) = \tfrac{1}{2} \text{ guard band width.}$$

Two adjacently positioned wide tracks can overlap each other if:

$$(\text{wide track width} - \text{partial overlap track width}) > \tfrac{1}{2} \text{ guard band.}$$

Figure 11:
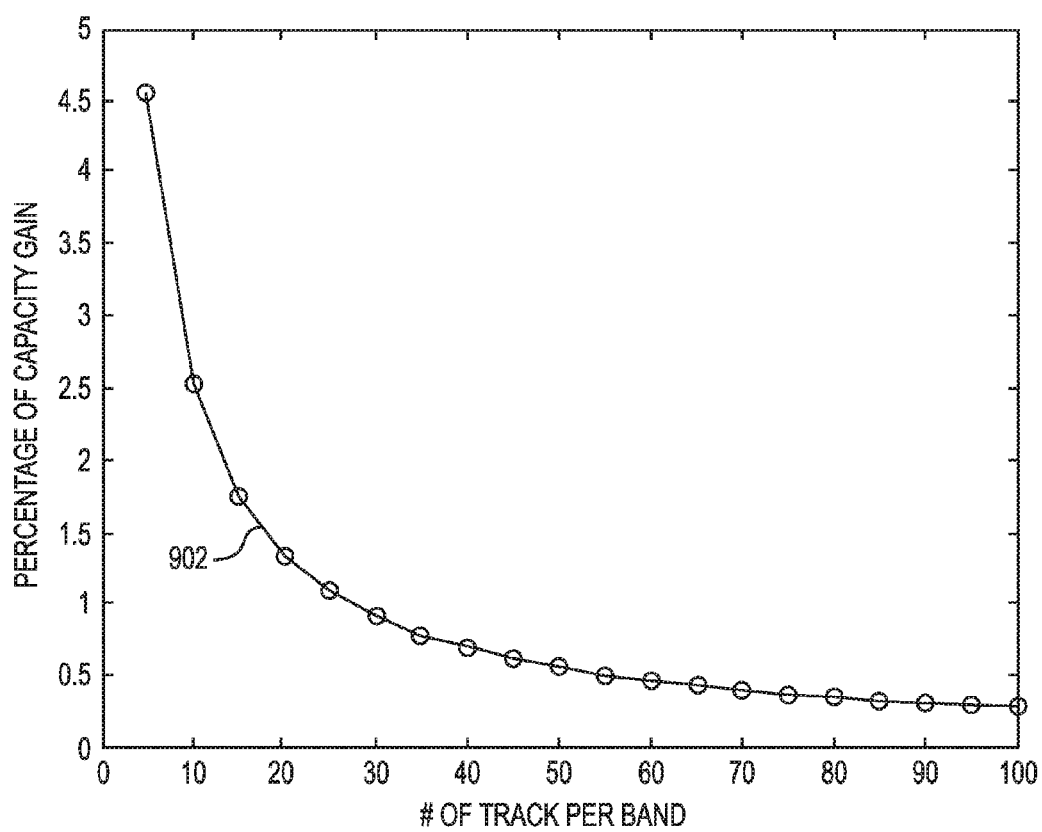
FIG. 11 shows the capacity gain versus number of tracks inside a band when implementing an SMR methodology using a HAMR head in accordance with various embodiments.

FIG. 11 shows the capacity gain versus number of tracks inside a band when implementing an SMR methodology using a HAMR head in accordance with various embodiments. More particularly, FIG. 11 shows the capacity gain versus number of tracks inside the band by assuming a single track guard band when partially overlapped track pitch is 450 KTPI and a normal written track width is 350 KTPI.

It is noted that, similar to current PMR SMR that measures the TPIC (Tracks Per Inch Capability) for both shingling directions in each zone and selects the direction that achieves higher TPIC, the capacity for the alternating direction condition can be directly calculated based on both directions' TPIC value, and the direction that achieves the highest capacity can be selected. Also, the wide track's BPI, TPI, and overlapping size may be optimized to achieve high capacity. Further, the alternating shingling direction methodology disclosed herein can be implemented in PMR SMR at the location where the skew is close to zero.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a writer configured for heat-assisted magnetic recording of data to a magnetic storage medium comprising a plurality of concentric bands each comprising a plurality of data tracks; and
    a controller coupled to the writer, the controller configured to:
        move the writer in a first direction to successively write data to a plurality of partially overlapping narrow data tracks and then to a wide track of a first band;
        move the writer further in the first direction to a second band adjacent the first band; and
        move the writer in a second direction opposite the first direction to successively write data to partially overlapping narrow data tracks and then to a wide track of the second band;
    wherein the wide tracks of the first and second bands are positioned adjacent to one another with no intervening narrow data track therebetween.

2. The apparatus of claim 1, wherein a guard band separates the wide tracks of the first and second bands.

3. The apparatus of claim 1, wherein a guard band is absent between the wide tracks of the first and second bands.

4. The apparatus of claim 1, wherein the wide track of the second band partially overlaps the wide track of first band.

5. The apparatus of claim 1, wherein after the wide track of the second band is written, the controller is further configured to:
- move the writer in the first direction to a third band adjacent the second band;
- move the writer in the first direction to successively write data to partially overlapping narrow data tracks and then to a wide track of the third band;
- move the writer further in the first direction to a fourth band adjacent the third band; and
- move the writer in the second direction to successively write data to partially overlapping narrow data tracks and then to a wide track of fourth band;
- wherein the wide tracks of the third and fourth bands are positioned adjacent to one another with no intervening narrow data track therebetween.

6. The apparatus of claim 5, wherein a guard band separates adjacent narrow tracks of the second and third bands.

7. The apparatus of claim 5, wherein a guard band separates the wide tracks of the third and fourth bands.

8. The apparatus of claim 5, wherein a guard band is absent between the wide tracks of the third and fourth bands.

9. The apparatus of claim 1, wherein the wide track of the fourth band partially overlaps the wide track of third band.

10. An apparatus, comprising:
- a writer configured for heat-assisted magnetic recording of data to a magnetic storage medium; and
- a controller coupled to the writer, the controller and writer configured to write data to a plurality of concentric bands of the medium each comprising a plurality of partially overlapping narrow data tracks and a wide track, wherein the wide tracks of successive bands are positioned adjacent to one another with no intervening narrow data track therebetween.

11. The apparatus of claim 10, wherein a guard band is absent between the adjacently positioned wide tracks.

12. The apparatus of claim 10, wherein adjacent wide tracks partially overlap each other.

13. The apparatus of claim 11, wherein a guard band separates adjacently positioned partially overlapping narrow data tracks of at least some of the successive bands.

14. A method, comprising:
- moving a writer configured for heat-assisted magnetic recording in a first direction relative to a magnetic storage medium to successively write data to a plurality of partially overlapping narrow data tracks and then to a wide track of a first band of the medium;
- moving the writer further in the first direction to a second band adjacent the first band; and
- moving the writer in a second direction opposite the first direction to successively write data to partially overlapping narrow data tracks and then to a wide track of the second band;
- wherein the wide tracks of the first and second bands are positioned adjacent to one another with no intervening narrow data track therebetween.

15. The method of claim 14, wherein a guard band is absent between the wide tracks of the first and second bands.

16. The method of claim 14, wherein the wide track of the second band partially overlaps the wide track of first band.

17. The method of claim 14, wherein after the wide track of the second band is written:
- moving the writer in the first direction to a third band adjacent the second band;
- moving the writer in the first direction to successively write data to partially overlapping narrow data tracks and then to a wide track of the third band;
- moving the writer further in the first direction to a fourth band adjacent the third band; and
- moving the writer in the second direction to successively write data to partially overlapping narrow data tracks and then to a wide track of fourth band;
- wherein the wide tracks of the third and fourth bands are positioned adjacent to one another with no intervening narrow data track therebetween.

18. The method of claim 17, wherein a guard band separates the wide tracks of the third and fourth bands.

19. The method of claim 17, wherein a guard band is absent between the wide tracks of the third and fourth bands.

20. The method of claim 17, wherein the wide track of the fourth band partially overlaps the wide track of third band.

* * * * *